United States Patent [19]

Bernard et al.

[11] Patent Number: 4,688,141
[45] Date of Patent: Aug. 18, 1987

[54] DEVICE FOR ELECTROSTATICALLY SUSPENDING A BODY OR SAMPLE

[75] Inventors: Alain M. Bernard, Fresnes; Jean-Paul L. Canny, Villemonble; Pierre L. Touboul, Bois d'Arcy, all of France

[73] Assignee: Office National d'Etudes et de Recherches Aerospatiales (ONERA), Chatillon, France

[21] Appl. No.: 748,721

[22] Filed: Jun. 25, 1985

[30] Foreign Application Priority Data

Jun. 25, 1985 [FR] France ............... 84 10018

[51] Int. Cl.⁴ ............ G01P 15/125; G01P 15/13
[52] U.S. Cl. .................. 361/233; 324/60 C; 73/517 B
[58] Field of Search .......... 361/233; 324/60 C, 60 R; 517/13; 73/517 R, 516 R

[56] References Cited

U.S. PATENT DOCUMENTS

| | | | |
|---|---|---|---|
| 3,438,267 | 4/1969 | Contensou et al. | 73/517 B |
| 3,742,767 | 7/1973 | Bernard et al. | 73/517 B |
| 4,059,797 | 11/1977 | Gay | 324/60 C |
| 4,393,710 | 7/1983 | Bernard | 73/517 B |
| 4,566,328 | 1/1986 | Bernard et al. | 73/517 B |
| 4,583,404 | 4/1986 | Bernard et al. | 73/517 B |

Primary Examiner—L. T. Hix
Assistant Examiner—D. Rutledge
Attorney, Agent, or Firm—Lowe, Price, LeBlanc, Becker & Shur

[57] ABSTRACT

A device for electrostatically suspending an electrically charged body comprises at least two spherical electrodes serving simultaneously for capacitive position detection and electrostatic positioning control for the body.

5 Claims, 6 Drawing Figures

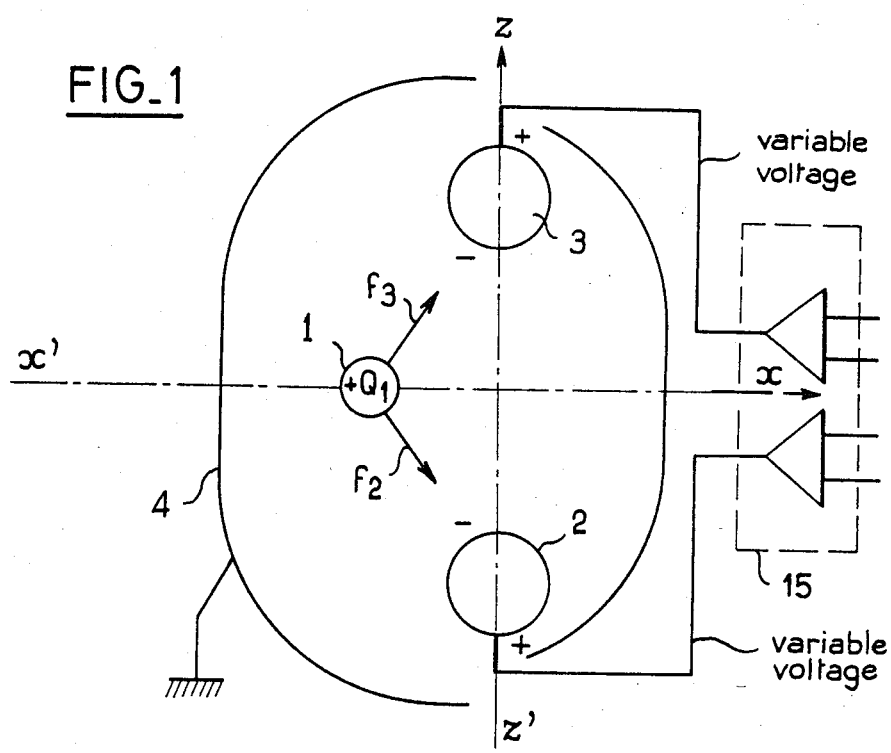
FIG_1
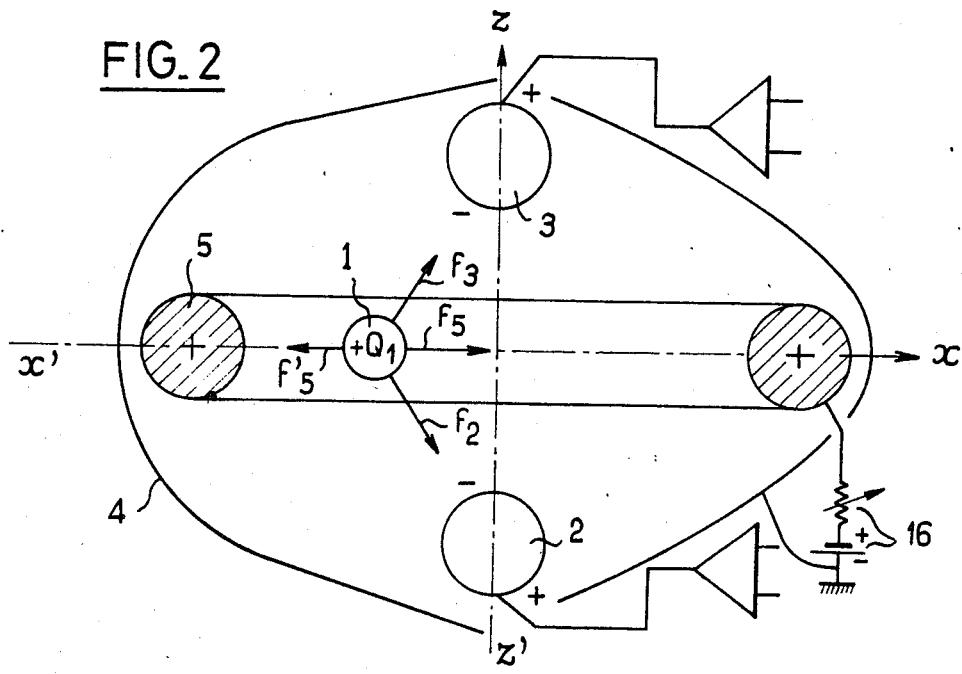
FIG_2

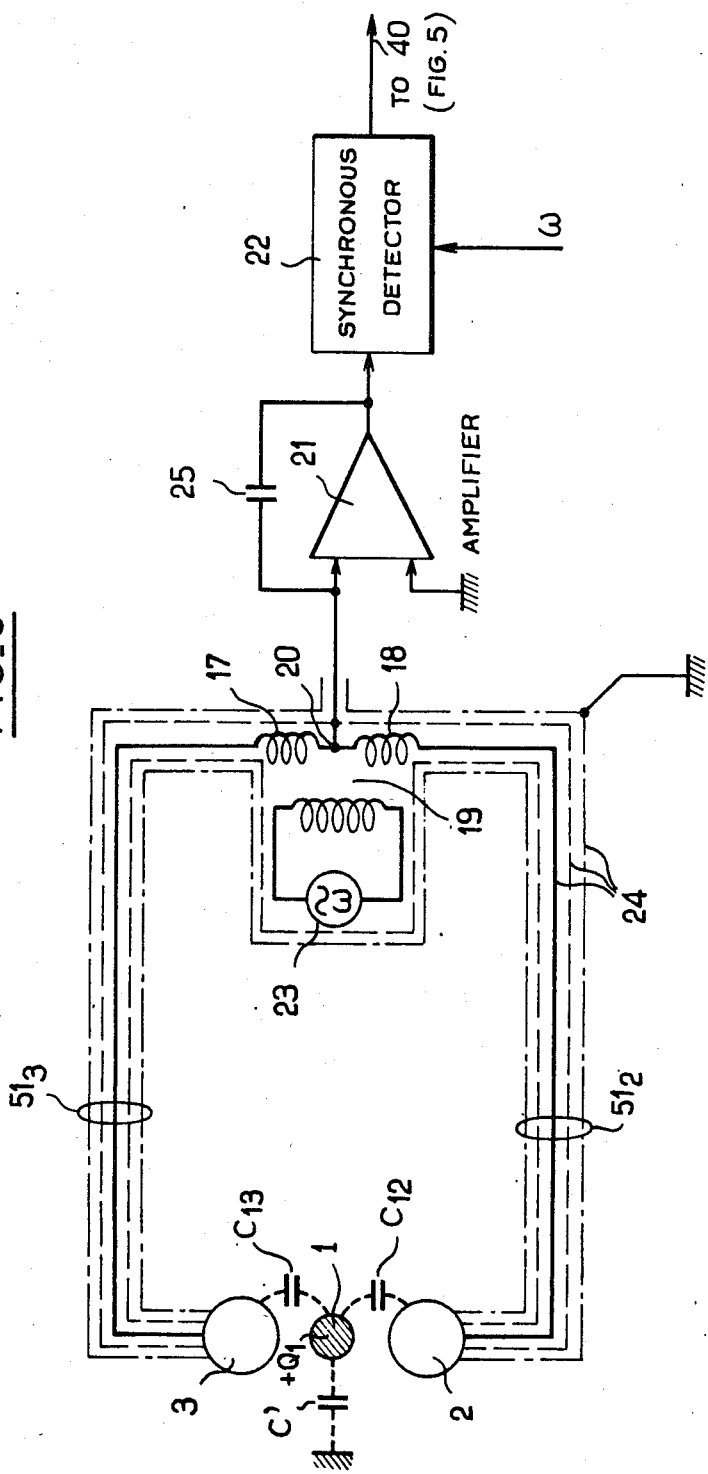

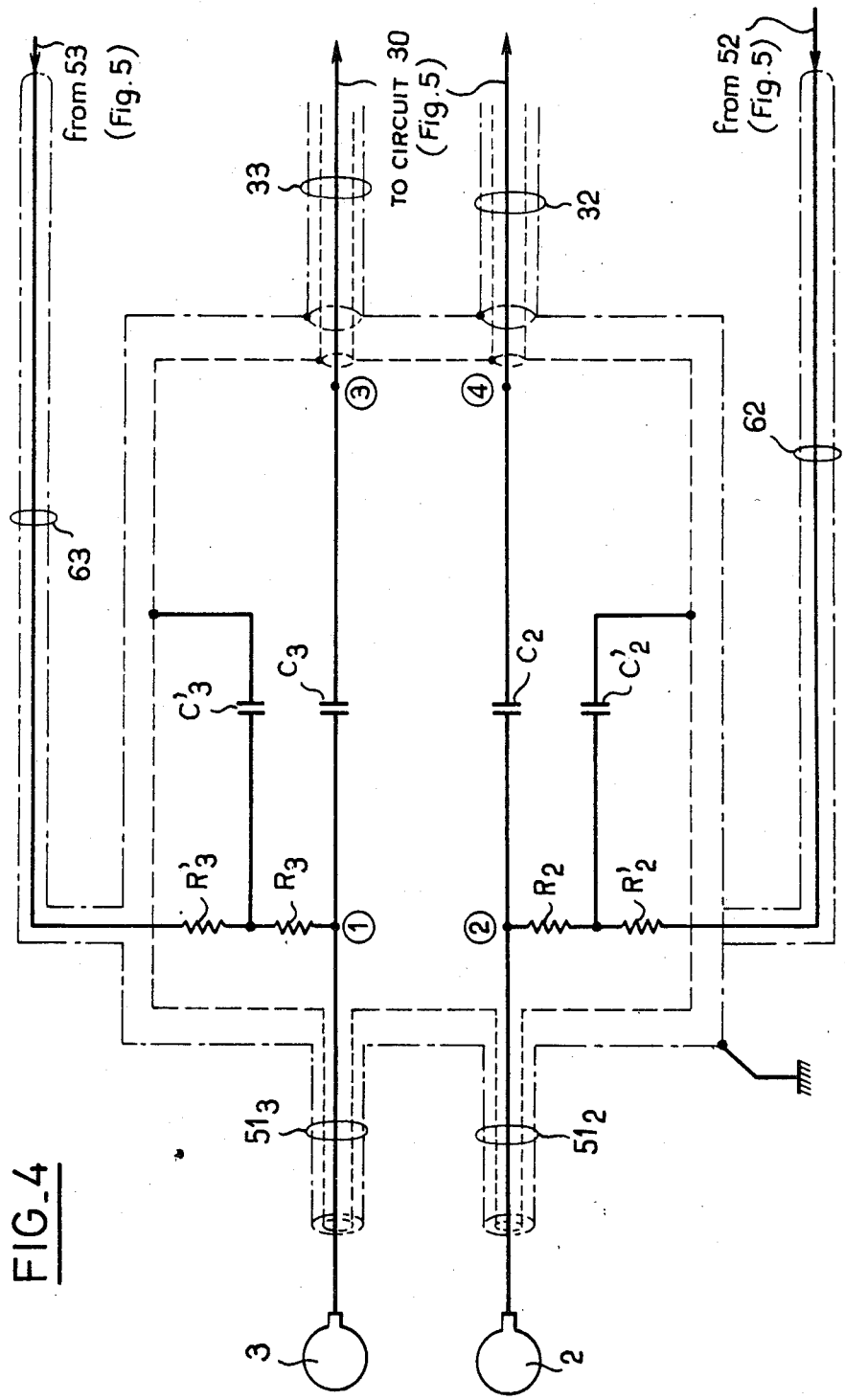
FIG_4

DEVICE FOR ELECTROSTATICALLY SUSPENDING A BODY OR SAMPLE

BACKGROUND OF THE INVENTION

1. Field of the Invention

The present invention relates to an electrostatic suspension device or levitator in microgravity or gravity conditions for a sample of material.

When producing materials in space by thermal and-/or chemical processes, it is necessary in certain cases to obviate any contamination of the material that might be caused by physical contact with a holder or a crucible.

2. Description of the Prior Art

U.S. Pat. No. 4,059,797 filed Dec. 27, 1976, in the name of the assignee of the present application, discloses electrostatic suspension accelerometers in which the acceleration measurement is deduced from electrostatic forces required to hold a test weight in a position defined with respect to the body of the apparatus or to return said weight to this position.

Those accelerometers that are three-dimensional in nature comprise a floating spherical or cubic test weight and a set of electrodes, made up of at least two electrodes per unidirection. The electrodes both detect the position of the test weight and reposition said weight by slaving. The difference in capacity generated by two aligned electrodes and the test weight is measured applying an alternating current across the said electrodes and the resultant signal is processed in a proportional, integral, differential circuit which supplies repositioning signals back to the same electrodes.

In apparatus of this nature, the test weight can be steadied or stabilized only when the arrangement is three-dimensional and comprises at least six electrodes. Further, the potential on the test weight must be held equal to that of the apparatus body for maximum accuray.

SUMMARY OF THE INVENTION

The main object of the present invention is to provide an electrostatic suspension device or levitator for a sample of material, that is stable space-wise although it comprises only two electrodes.

A further object of the invention is an electrostatic suspension device that is stable space-wise although it comprises only three electrodes.

In accordance with the invention, the device for suspending an electrically charged material sample comprises at least two spherical electrodes used simultaneously for capacitive position detection and for electrostatic positioning control.

A further aspect of the invention is that the suspension device comprises, besides the two spherical electrodes, a third annular electrode that is raised to a potential with the same polarity as the charge on the sample.

Before going any further, theoretical consideration is taken of the movement of a conducting body in an electrostatic field pattern.

The electrical charges are assigned the lettter Q, the potentials V, the relative capacitances C and the forces F. The index 1 is used for the sample and the indices 2 to n for the electrodes.

To determine the value of the electrostatic force exerted on the sample, consider a virtual displacement thereof in which the potentials $V_2$ to $V_n$ are constant as is the charge $Q_1$ on the sample. During this virtual displacement, the charges $Q_2$ to $Q_n$ and the potential $V_1$ vary. The force $F_z$ applied to the sample along the direction z may be written as:

$$F_z = -\frac{\partial}{\partial z}\left[\sum_{i=1}^{n} \frac{1}{2} Q_i V_i\right] + \sum_{i=2}^{n} V_i \frac{\partial Q_i}{\partial z} \quad (1)$$

The charges $Q_i$ may be expressed in terms of the voltage $V_i$ by the matrix equation:

$$Q_i = \sum_{j=1}^{n} C_{ij} V_{ij} \quad (2)$$

where $C_{i,j}$ is the relative capacitance between the electrodes i and j when $i \neq j$ and the self-capacitance of an electrode when $i = j$. $C_{i,j}$ is considered to be negative and $C_{i,i}$ positive.

On the basis of equations (1) and (2), the following expression can be obtained for the force $F_z$:

$$F_z = a(Q_1^2) + \sum_{i,j=2}^{n} b_{ij}(V_i V_j) + \sum_{i=2}^{n} d_i(Q_1 V_i) \quad (3)$$

It can be seen from expression (3) that the force $F_z$ is made up of three components:

(1) attractive forces between the charged sample and its electrical images on the electrodes around it, where these forces take the form $aQ_1^2$;

(2) attractive or repellent forces between each electrode and the charged images of all the electrodes, carried by the suspended sample; these forces take the form $b_{i,j} V_i V_j$, where $V_i$ and $V_j$ are the potentials on the electrodes i and j;

(3) forces of the form $d_i Q_1 V_i$ representing the attraction or repulsion of each electrode i on the charge $Q_1$ carried by the sample.

The coefficients a, $b_{i,j}$ and $d_i$ are combinations of the electrostatic relative capacitance coefficients and the spatial derivatives thereof and are therefore functions of the spatial coordinates of the suspended sample.

Assuming that the suspension arrangement, in addition to the sample 1, contains two spherical electrodes 2 and 3 and a conducting envelope 4 such that the conductors 1, 2, 3 and 4 present self inductance or develop relative inductance therebetween, then equation (3) may be written in terms of the coefficients $C_{11}$, $C_{12}$, $C_{13}$, $C_{22}$, $C_{23}$, $C_{33}$ (it is assumed that $V_3 = -V_2$):

$$F_z = \frac{1}{2} \frac{\partial C_{11}}{\partial z} \frac{Q_1^2}{C_{11}^2} +$$

$$\frac{1}{2} \frac{\partial}{\partial z}\left[C_{22} + C_{33} - \frac{(C_{12} - C_{13})^2}{C_{11}} - 2C_{23}\right] V_2^2 +$$

$$\frac{\partial}{\partial z}\left(\frac{C_{12} - C_{13}}{C_{11}}\right) Q_1 V_2$$

If there is also a toroidal electrode 5, equation (3) may be expressed in terms of the aforesaid relative and self capacitance coefficients plus $C_{15}$, $C_{25}$, $C_{35}$, $C_{55}$:

$$F_z = \frac{1}{2} \frac{\partial C_{11}}{\partial z} \frac{Q_1^2}{C_{11}^2} +$$

$$\frac{1}{2} \frac{\partial}{\partial z}\left[ C_{22} + C_{33} - \frac{(C_{12}-C_{13})^2}{C_{11}} - 2C_{23} \right] V_2^2 +$$

$$\frac{\partial}{\partial z}\left( \frac{C_{12}-C_{13}}{C_{11}} \right) Q_1 V_2 +$$

$$\frac{1}{2} \frac{\partial}{\partial z}\left( C_{55} - \frac{C_{15}^2}{C_{11}} \right) V_5^2 + \frac{\partial}{\partial z}\left( \frac{C_{15}}{C_{11}} \right) Q_1 V_5 +$$

$$\frac{\partial}{\partial z}\left( C_{25} - C_{35} - \frac{C_{15}}{C_{11}}(C_{12}-C_{13}) \right) V_2 V_5$$

BRIEF DESCRIPTION OF THE DRAWINGS

The foregoing objects and features will become apparent from the following detailed description with reference to the accompanying drawings in which:

FIG. 1 is a schematic diagram of a suspension system with two spherical electrodes;

FIG. 2 is a schematic diagram of a suspension system with three electrodes, two spherical and one annular or toroidal;

FIG. 3 is a circuit diagram of a circuit using the principle of capacitive detection of the sample position;

FIG. 4 is a circuit diagram of part of a system for superimposing position detection and positional control signals on the electrodes;

DESCRIPTION OF THE PREFERRED EMBODIMENTS

Figure 5:
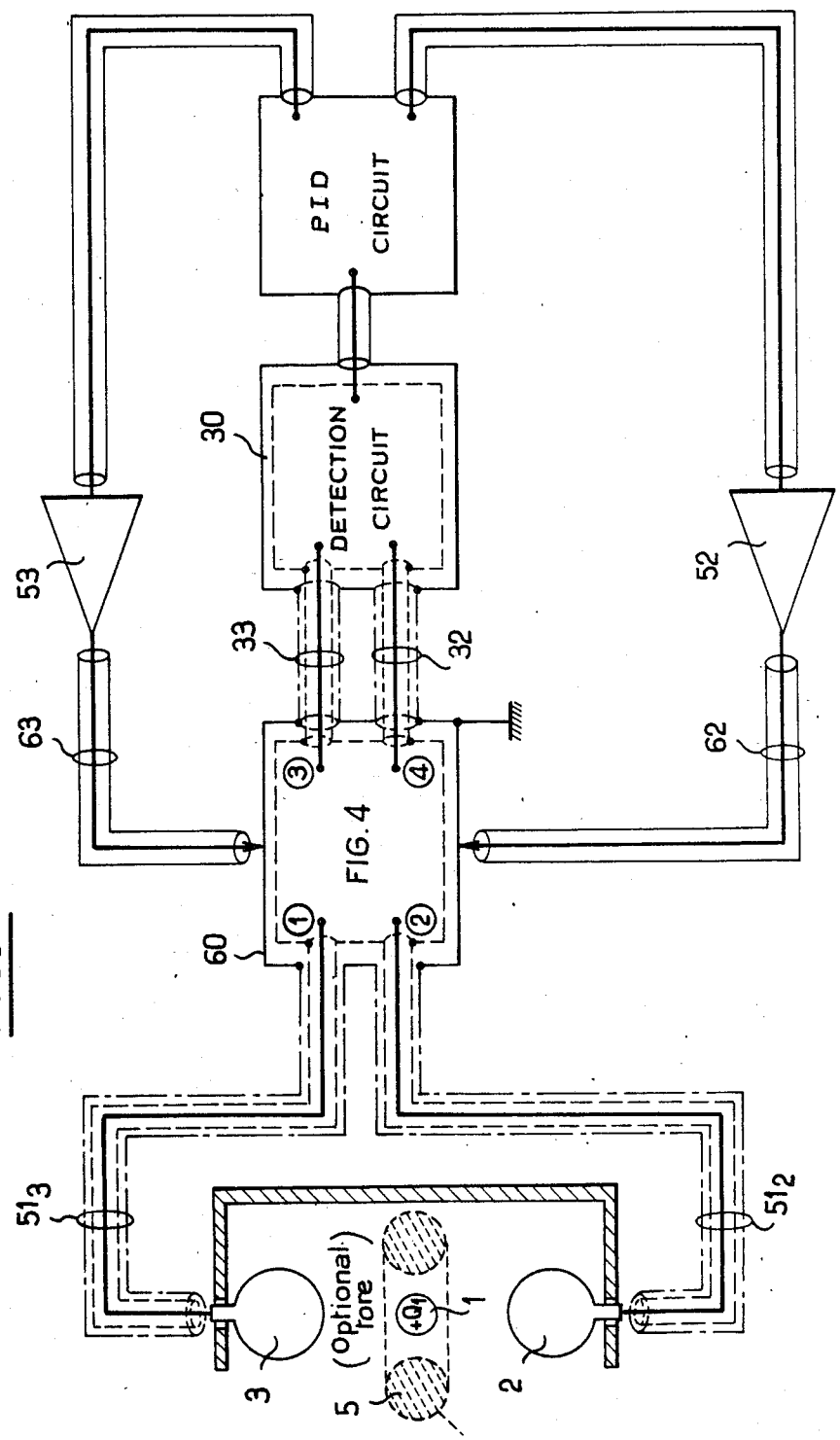
FIG. 5 is a circuit diagram of a system for slaving along one axis together with the electrical connections between the electrodes and the position detection and positional control currents.

Reference is now made to FIG. 1 wherein there is illustrated a system including charged, suspended sample 1 and spherical electrodes 2 and 3. Electrodes 2 and 3 are responsive to opposite polarity voltages derived from a pair of amplifiers included in system 15. The resulting electrostatic field between electrodes 2 and 3 develops a Coulomb force on sample 1. Further charged sample 1 develops charges of polarity opposed to its own polarity on electrodes 2 and 3. The charges on electrodes 2 and 3 act on the charge on sample 1 to develop attractive forces by capacitance effect. Thus sample 1 is subject to effect. Thus the sample is subjected to the forces $f_2$ and $f_3$ that exert an attractive pull towards the axis z'z such that the slaving arrangement along this axis also holds the sample in the xOy plane.

With reference now to FIG. 2, a metal toroid 5 is disposed at the perpendicular bisector of a line joining the centers of electrodes 2 and 3. Annular electrode 5 reduces only very slightly the electrostatic capacitance between the sample and the spherical electrodes. The charge images of $Q_1$ on the ring 5 generate a destabilizing effect $f'_5$. By maintaining ring 5 at a potential with the same polarity as the charge on sample, a stabilizing force $f_5$ is obtained; stabilizing force $f_5$ can be made greater than $f'_5$ via an adjustable voltage source 16.

In the suspension devices illustrated in FIGS. 1 and 2, the sample 1 carries a charge $+Q_1$. This charge can e.g., be achieved by momentarily contacting sample 1 with a high voltage source of 10 kV while all of electrodes 2, 3 and 5 are grounded. If it is assumed that $C_{11}=3$ pF, the value of the charge on sample 1 is $3 \times 10^{-8}$ coulombs.

In FIG. 3, the electrodes 2 and 3 are connected to the secondary windings 17 and 18 of a differential transformer 19, such that the capacities existing between the electrodes and sample 1 become part of a capacitive bridge.

The mid-point 20 on the secondary windings is connected to an operational amplifier 21, having an output that drives synchronous detector 22. Also responsive to the differential transformer supply current generated by alternating source 23. Detector 22 derives a signal proportional to the difference in the capacitances coefficients ($C_{13}-C_{12}$) and hence the positional fluctuation of sample 1. Triaxial cables $51_2$ and $51_3$ to connect electrodes 2 and 3 to the differential transformer secondary windings 17 and 18 to prevent the position measurement from depending on stray capacities in the connection wiring. The stray capacities between the connections (inside wire) and inside sheathing are in parallel with the low impedance of secondary windings 17 and 18. The stray capacities between the inside and outside sheating are in parallel with the input impedance of amplifier 21 that is reduced to a very low level by capacitive feedback achieved with capacitor 25.

The detecting circuit 30 (FIG. 5) is of the type described in connection with FIG. 4 of U.S. Pat. No. 4,059,797 of Dec. 27, 1976. No description of this circuit is given here. The circuit 30 is wired to proportional, integral, differential corrector circuit 40 that delivers two signals in phase opposition to high voltage amplifiers 52 and 53. The outputs from amplifiers 52 and 53 are connected via the leads 62 and 63 to the circuit 60 for superimposing high frequency, low voltage position detection signals on low frequency, high voltage position control signals.

The superimposing circuit 60 (FIG. 4) receives the position detection signals via triaxial cables $51_2$ and $51_3$ as well as the positioning control signals via the coaxial cables 62 and 63. Circuit 60 feeds the position detection signals to the circuit 30 via triaxial cables 32 and 33.

The detection signals are high frequency while the position control signals are either low frequency or direct current. The detection signals are fed from electrodes 2 and 3 to circuit 30 via series capacitors $C_2$ and $C_3$ while the control signals are supplied to the electrodes from amplifiers 52 and 53 via series resistors $R_2$, $R'_2$ and $R_3$, $R'_3$. Shunt capacitors $C'_2$ and $C'_3$ improve decoupling between the detection and position control signals.

Figure 6:
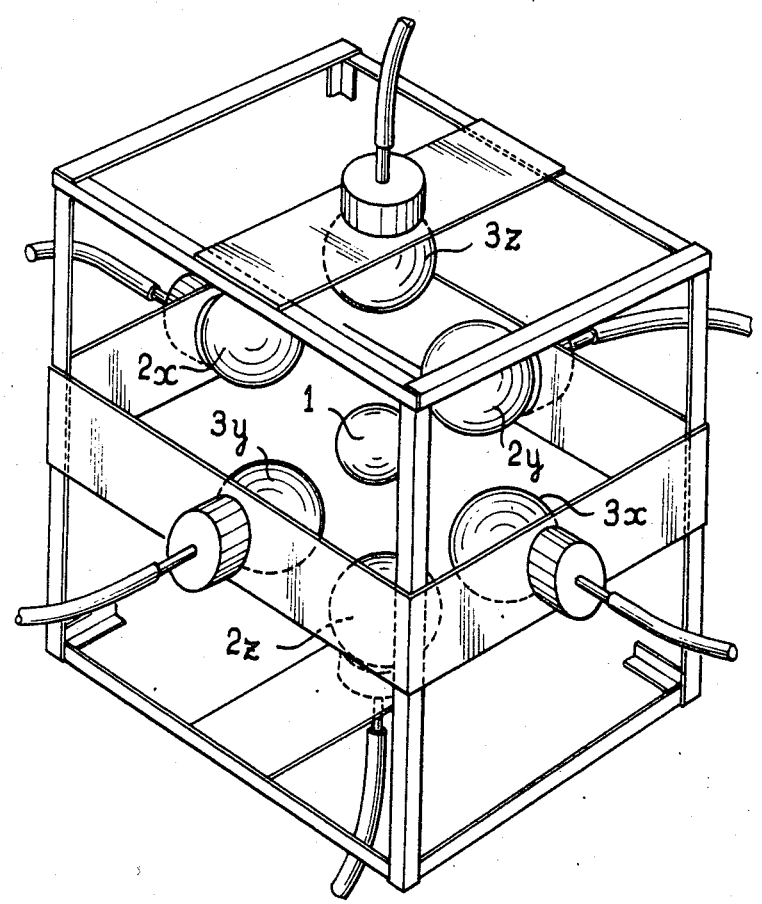
FIG. 6 is a perspective view of a three-dimensional suspension device.

FIG. 6 is a perspective view of a three-dimensional suspension device including charged sample 1 and six spherical elecrodes $2x$, $2y$, $2z$ and $3x$, $3y$, $3z$ which are arranged in pairs along three mutually orthogonal axes.

Although the invention has been described in relation to a given example of an embodiment, it is quite clear that other variations are possible without departing from the scope of the invention. For example, the detection and positioning control signals have been separated by routing one type via a capacitive path and the other via resistive path. It would, of course, be possible to separate them using a system of filters.

What we claim is:

1. A device for electrostatically suspending a sample of material comprising a sample carrying an electrostatic charge;

at least two conductive spherical electrodes respectively fed by high voltages of opposite polarity;

a conductive screen surrounding said sample and electrodes and brought to ground potential whereby the sample is submitted to a first force proportional to the square of the sample charge, a second force proportional to the product of the electrode voltages, a third force proportional to the product of the sample charge by the electrode voltage; and means for varying a voltage feed to the electrodes.

2. A device for electrostatically suspending a sample according to claim 1 wherein the sample electrostatic charge is positive.

3. A device for electrostatically suspending a sample according to claim 1 wherein the device further comprises a toroidal conductive electrode having its center at the mid-point of a line joining the centers of two of said spherical electrodes, said toroidal electrode being brought to a voltage having the same polarity as the charge of said sample.

4. A device for electrostatically suspending a sample as claimed in claim 1 comprising a differential transformer with a primary winding fed with alternating current and two secondary windings connected to the spherical electrodes via a circuit for superimposing sample position detection signals and sample positioning control signals to form a capacitive measuring bridge and to measure the differences in the capacitance coefficients between the sample and the electrodes, wherein electric lines connecting the electrodes to the transformer are triaxal cables with an inner sheathing connected to the mid-point of the secondary windings and an outer sheathing connected to the ground potential.

5. A device for electrostatically suspending a sample as claimed in claim 2 comprising a differential transformer with a primary winding fed with alternating current and two secondary windings connected to the spherical electrodes via a circuit for superimposing sample position detection signals and sample positioning control signals to form a capacitive measuring bridge and to measure the differences in the capacitance coefficients between the sample and the electrodes, wherein electric lines connecting the electrodes to the transformer are triaxal cables with an inner sheathing connected to the mid-point of the secondary windings and an outer sheathing connected to the ground potential.

* * * * *